US006823142B1

United States Patent
Tanaka et al.

(10) Patent No.: US 6,823,142 B1
(45) Date of Patent: Nov. 23, 2004

(54) POLARIZATION MODE DISPERSION COMPENSATING APPARATUS

(75) Inventors: Hideaki Tanaka, Kamifukuoka (JP); Masashi Usami, Kamifukuoka (JP); Shinsuke Tanaka, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 704 days.

(21) Appl. No.: 09/594,856

(22) Filed: Jun. 15, 2000

(30) Foreign Application Priority Data

Jun. 15, 1999 (JP) .......................................... 11-167635

(51) Int. Cl.[7] .............................. G02B 6/00; G02B 5/30; H04B 10/00; H04B 10/12; H04B 10/04

(52) U.S. Cl. ........................ 398/152; 398/147; 398/159; 398/158; 398/184; 385/11; 359/483; 359/484; 359/499

(58) Field of Search ................................ 398/147, 152, 398/159, 184, 213, 158; 385/11; 359/483–502

(56) References Cited

U.S. PATENT DOCUMENTS

| 5,473,457 A | 12/1995 | Ono | |
|---|---|---|---|
| 5,508,839 A | 4/1996 | Ono | |
| 5,659,412 A | * 8/1997 | Hakki | 359/156 |
| 5,739,943 A | 4/1998 | Ohshima et al. | 359/281 |
| 5,793,511 A | 8/1998 | Bülow | |
| 6,130,766 A | * 10/2000 | Cao | 359/161 |

FOREIGN PATENT DOCUMENTS

| EP | 0 507 508 A2 | 10/1992 |
|---|---|---|
| EP | 0 716 516 A1 | 6/1996 |

OTHER PUBLICATIONS

F. Roy, et al., "A Simple Dynamic Polarization Mode Dispersion Compensator", Alcatel Corporate Research Centre and Dip. Ingegneria dell'informazione, Universita di Parma, Viale delle Scienze, Parma, Italy, TuS4–1, pp. 275/278.

H. Ooi, et al., "Automatic Polarization–Mode dispersion Compensation in 40–Gbit/s Transmission", Fujitsu Laboratories Ltd., Japan, WE5–1, pp. 86–88.

Takashi, et al., "Polarization Control Method for Suppressing Polarization Mode Dispersion Influence in Optical Transmission Systems" Journal of Lightwave Technology vol. 12, No. 5, IEEE. New York, US, May 1, 1994, pp. 891–898, XP000480116.

* cited by examiner

Primary Examiner—M. R. Sedighian
(74) Attorney, Agent, or Firm—Christie, Parker & Hale, LLP

(57) ABSTRACT

A signal light from an optical transmission line propagates on a first optical fiber and enters a polarization converter. The polarization converter converts the input light with the given polarization into a linear polarization with a desired angle using two Faraday rotators and a quarter wave plate between them. The output light of the polarization converter propagates on a second optical fiber and enters a polarization beam splitter. The polarization beam splitter splits the light from the second optical fiber into two mutually orthogonal polarization components (e.g. TE and TM components) and outputs either of them (e.g. the TE component) toward a third optical fiber. A portion of the light propagating on the third optical fiber is split by an optical coupler and enters a photodetector. A bandpass filter (BPF) extracts a clock component of the signal from an output of the photodetector. A controller controls the polarization converter to adjust the polarization angle of the output light so as to maximize the output of the BPF according to the output of the BPF.

16 Claims, 8 Drawing Sheets

POLARIZATION MODE DISPERSION COMPENSATING APPARATUS

FIELD OF THE INVENTION

This invention relates to a polarization mode dispersion compensating apparatus, and more particularly to an apparatus for compensating polarization mode dispersion that may occur to signal light in an optical transmission line.

BACKGROUND OF THE INVENTION

Along with the spread of the Internet, a demand for larger transmission capacity has been increasing without stopping. As is known in the art, optical fiber communication is suitable for the large capacity transmission. In the optical fiber transmission, it is relatively easy to increase the transmission capacity by employing a wavelength multiplexing transmission system, in which signal lights with different wavelengths propagate on only one optical fiber, so as to increase the number of the wavelengths and accelerate the modulation rate of the signal lights with the respective wavelengths. It has been the mainstream to employ a return to zero (RZ) signal in order to improve the receiving sensitivity and decrease cross phase modulation when the wavelength multiplexing transmission is performed.

Ideally speaking, an optical fiber should be rotationally symmetric about a center axis of a core (i.e. a center axis of the fiber). However, owing to the slight asymmetricity due to fluctuations in the production process, the amount of chromatic dispersion of the signal light differs according to an azimuthal direction around the center axis of the core. This causes the so-called polarization mode dispersion. When the modulation rate of the signal light exceeds 5 Gbit/s, as shown in FIG. 8, the RZ signal is divided into two orthogonal polarization components (i.e. the so-called TE and TM components) in the time domain due to the polarization mode dispersion. This causes bit errors in a receiving process at a receiving side. Although the time intervals of the divided orthogonal components depend on the condition of the optical transmission line, they generally vary disorderly with time.

Means for compensating such polarization mode dispersion are disclosed by Fabian Roy et al. in OFC'99IOOC (OFC (Optical Fiber Communication) and the International Conference on Integrated Optics and Optical Fiber Communications (IOOC)), TuS 4-1, pp. 275–278 and by Hiroki Ooi et al. in OFC'99IOOC (OFC (Optical Fiber Communication) and the International Conference on Integrated Optics and Optical Fiber Communications (IOOC) WE 5-1).

A conventional polarization mode dispersion compensating apparatus generally comprises a polarization controller for converting a signal light from an optical transmission line into two orthogonal polarizations, a polarization mode dispersion compensating element for giving a certain time difference between the two orthogonal polarization components of the output light, and a measurer for measuring the intensity or degree of polarization (DOP) of an output light from a polarization mode dispersion compensating element and for controlling the polarization controlling amount or rotational angle of the polarization controller so as to maximize the measured result. In the former reference, the DOP is measured. In the latter reference, a clock component of 20 GHz is measured which frequency is half of a 40 Gbit/s NRZ signal light.

The polarization controller comprises a configuration in which a quarter wave plate and a half wave plate are connected in serial, and the measurer rotates mechanically both wave plates about the optical axis according to the measured result. The polarization of the incident light is, as a result, converted into a linear polarization. The polarization dispersion compensating element generally comprises a polarization maintaining fiber. The polarization maintaining fiber comprises mutually orthogonal slow and fast axes having different chromatic dispersions each other. That is, since the propagation speeds of the signal light differ between the two axes, the polarization maintaining fiber can give the suitable amount of the polarization mode dispersion according to the difference of propagation speeds between the two axes and the propagation length. In the conventional art, the polarization controller is feedback-controlled so as to maximize the optical intensity or DOP of the output light from the polarization maintaining fiber. In this way, the time difference between the orthogonal components given at the optical transmission line is removed by the polarization maintaining fiber and thus the polarization mode dispersion is compensated.

In the standard long-haul optical fiber transmission line, the polarization of the signal light varies every several ten msec at the shortest. However, the response of the mechanical polarization controller having performed per second, the existing polarization mode dispersion compensating apparatus is unable to follow the fast polarization variation.

Also, in the conventional system, the mechanical polarization converter is employed and thus it is difficult to use it over a long period. In other words, it is not very reliable.

Moreover, in the conventional apparatus, the polarization maintaining fiber is employed of having a constant compensation amount for the polarization mode dispersion. Owing to this, when a signal light with a little amount of the polarization mode dispersion is input, the polarization maintaining fiber adds the polarization mode dispersion to the signal instead, conversely increasing the bit error rate.

SUMMARY OF THE INVENTION

An object of the present invention is to provide a polarization mode dispersion compensating apparatus for adapting to any polarization state of input signal light and compensating the polarization mode dispersion.

Another object of the present invention is to provide a polarization mode dispersion compensating apparatus for compensating the polarization mode dispersion of a wider range.

A further object of the present invention is to solve the foregoing inconveniences and to provide a polarization mode dispersion compensating apparatus for responding more rapidly.

A still further object of the present invention is to provide a polarization mode dispersion compensating apparatus for automatically adapting to a polarization state of input signal light and compensating the polarization mode dispersion.

An even further object of the present invention is to provide a polarization mode dispersion compensating apparatus for maintaining high reliability over a long period.

According to the invention, an apparatus for compensating a polarization mode dispersion of an input signal light comprises a polarization converter for converting the polarization of the input signal light into a linear polarization, a polarization extractor for extracting at least one polarization component of two mutually orthogonal components in an output light of the polarization converter, a signal extractor for extracting a signal of a predetermined component from an output light of the polarization extractor, and a controller for controlling the polarization converter so as to increase the output of the signal extractor according to the output of the signal extractor.

With the aforementioned configuration, in the invention, the polarization mode dispersion compensating apparatus automatically adapts to the polarization state of the input signal light and compensates the polarization mode dispersion of the input signal light.

The signal extractor preferably comprises a photodetector for converting the output light of one polarization from the polarization extractor into an electric signal and an extractor for extracting the signal of the predetermined component from the output of the photodetector and applying it to the controller. The extractor comprises either electric filter for extracting the intensity of the clock component of the input signal light or for extracting a mean optical intensity of the input signal light. In this structure, the polarization mode dispersion of the input signal light can be compensated with such simple configuration.

The signal extractor preferably comprises a first photodetector for converting the output light of one polarization of the polarization extractor into an electric signal, a first extractor for extracting a signal of the predetermined component from an output of the first photodetector, a second photodetector for converting an output light of the other polarization of the polarization extractor into an electric signal, a second extractor for extracting a signal of the predetermined component from the output of the second photodetector, a comparator for comparing the outputs of the first and second extractors, and a selector for selecting one of the outputs between the first and second extractors and applying it to the controller according to the compared result of the comparator. The compensating apparatus further comprises a signal selector for selecting a signal to be carried on either one of polarizations from the polarization extractor according to the compared result of the comparator. The first and second extractors respectively comprise either electric filter for extracting the intensity of the clock component of the input signal light or for extracting a mean optical intensity of the input signal light. In this structure, even when the principal axis is changed, the polarization mode dispersion of the input signal light is continuously compensated without any difficulty.

The polarization converter comprises an apparatus for rotating the polarization of the input signal light with Faraday rotation. The polarization converter preferably comprises a first converter for moving the polarization of the input signal light along a parallel of latitude on a Poincare sphere using Faraday rotation, a wave plate for moving the output light of the first converter onto the equator of the Poincare sphere, and a second converter for moving the polarization of the output light of the wave plate along the equator of the Poincare sphere. The first and second converters respectively comprise a Faraday element, a magnet generator for applying a magnetic field in a direction of the optical axis of the Faraday element to the Faraday element according to a driving current from the controller, and a magnet for applying a magnetic field, which is in a direction orthogonal to the optical axis of the Faraday element and has the steady intensity for magnetically saturating the Faraday element, to the Faraday element. In this structure, it is possible to convert the polarization without moving parts and thus the high reliability is obtained over a long period. Also, a high-speed response is realized.

According to the invention, an apparatus for compensating the polarization mode dispersion of the input signal light comprises an optical divider for dividing the input signal light into two portions, first and second dispersion compensators, a signal selecting switch and a switch controller. The first dispersion compensator has a first polarization converter for converting a polarization of one output light from the optical divider into a linear polarization, a first polarization extractor for extracting a predetermined polarization component from the output light of the first polarization converter, and a first controller for controlling the polarization conversion of the first polarization converter so as to increase the intensity of the output light from the first polarization extractor. The second dispersion compensator has a second polarization converter for converting a polarization of the other output light from the optical divider into a linear polarization, a second polarization extractor for extracting a predetermined polarization component from the output light of the second polarization converter, and a second controller for controlling the polarization conversion of the second polarization converter so as to increase the intensity of the output light from the second polarization extractor in such condition that the control signal for the second polarization converter is restricted within a predetermined restricted region. The signal selecting switch selects either one of the outputs from the first and second dispersion compensators and at first selects the output of the first dispersion compensator. The switch controller monitors the controlled conditions of the first and second polarization converters by the first and second controller and controls the first and second controller as well as the signal selecting switch according to the monitored result. When the control signal of the first controller for the first polarization converter exceeds the restricted region, the switch controller controls the signal selecting switch to select the output of the second dispersion compensator and directs the second controller to control the polarization conversion of the second polarization converter so as to increase the output light from the second polarization extractor regardless of the restricted region of the control signal for the second polarization converter.

With this configuration, it becomes possible to compensate the polarization mode dispersion adaptively to the polarization state of the input signal light. Also, when the polarization of the optical transmission line changes to such degree that turns around the Poincare sphere more than once, the second dispersion compensator is immediately selected in order to prevent the polarization converter from continuously receiving the excessive control signal and depending on the dispersion compensating condition with the excessive control signal. This configuration hence obtains the high reliability.

Preferably, when the switch controller regulates the second controller to control the polarization conversion of the second polarization converter so as to increase the output light of the second polarization extractor regardless of the restricted region of the control signal for the second polarization converter, the switch controller adjusts the first controller to control the polarization conversion of the first polarization converter so as to increase the output light of the first polarization extractor in such condition that the control signal for the first polarization converter is restricted within a predetermined restricted region. In this structure, when the second dispersion compensator receives the excessive control signal, the switch controller can immediately switch to the first dispersion compensator again. The stable dispersion compensation therefore is realized continuously over a long period.

The first and second controllers respectively control the polarization conversions of the first and second polarization converters so as to increase signals of predetermined component obtained from the predetermined polarization components extracted by the first and second polarization extractors. The signal of the predetermined component comprises for instance a signal showing the clock component intensity of the input signal light.

Preferably, the first controller further comprises a first photodetector for converting the output light of one polarization out of the two orthogonal polarization components from the first polarization extractor into an electric signal, a first signal extractor for extracting a signal of the predetermined component from the output of the first photodetector, a second photodetector for converting the output light of the other polarization from the first polarization extractor into an electric signal, a second signal extractor for extracting a signal of the predetermined component from the output of the second photodetector, a first comparator for comparing the outputs from the first and second signal extractors, and a first selector for selecting one of the outputs from the first and second signal extractors according to the compared result of the first comparator, and controls the polarization conversion of the first polarization converter so as to increase the output of the first selector. The second controller further comprises a third photodetector for converting the output light of one polarization of the two orthogonal polarization components from the second polarization extractor, a third signal extractor for extracting a signal of the predetermined component from the output of the third photodetector, a fourth photodetector for converting the output light of the other polarization from the second polarization extractor into an electric signal, a fourth signal extractor for extracting a signal of the predetermined component from the output of the fourth photodetector, a second comparator for comparing the outputs from the third and fourth signal extractors, a second selector for selecting one of the outputs from the third and fourth signal extractors according to the compared result of the second comparator, and controls the polarization conversion of the second polarization converter so as to increase the output of the second selector. Also, the first dispersion compensator further comprises a first signal selector for selecting a signal to be carried on either one of the polarizations from the first polarization extractor according to the compared result of the first comparator, and the second dispersion compensator further comprises a second signal selector for selecting a signal to be carried on either one of the polarizations from the second polarization extractor according to the compared result of the second comparator. In this structure, even if the principal axis is changed, the polarization mode dispersion is constantly compensated without difficulty.

Preferably, the first and second polarization converters comprise apparatuses for rotating the polarization of the input light with Faraday rotation. To put it more concretely, the first and second polarization converters respectively comprise a first converter for moving the polarization of the input signal light along a parallel of latitude on the Poincare sphere using Faraday rotation, a wave plate for moving the output light of the first converter to the equator of the Poincare sphere, and a second converter for moving the polarization of the output light of the wave plate along the equator of the Poincare sphere. The first and second converters respectively comprise a Faraday element, a magnet generator for applying a magnetic field in the direction of the optical axis of the Faraday element to the Faraday element according to driving currents from the first and second controllers, and a magnet for applying the magnetic field, which is in a direction orthogonal to the optical axis of the Faraday element and has the steady intensity for magnetically saturating the Faraday element, to the Faraday element. In this structure, it is possible to convert the polarization without moving parts and thus the high reliability is obtained over a long period. Also, a high-speed response is realized.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
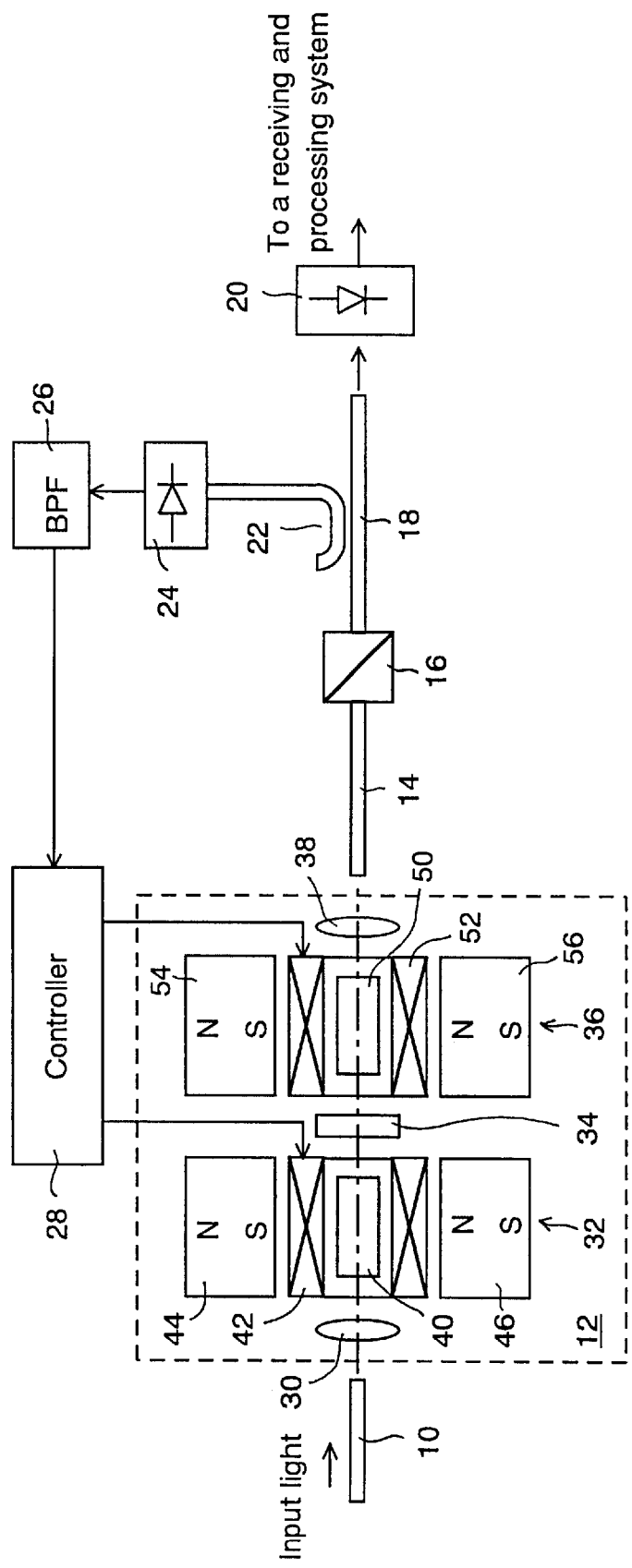
FIG. 1 shows a schematic block diagram of a first embodiment according to the invention.

FIG. 1 shows a schematic block diagram of a first embodiment according to the invention. The structure and operation of the embodiment shown in FIG. 1 are explained. A signal light from an optical transmission line enters an optical fiber 10, propagates on it and enters a polarization converter 12. The polarization converter 12 comprises an apparatus for converting an input light of any polarization into a linear polarization of a desired angle and its configuration is disclosed concretely in FIG. 4 of Japanese Patent Open Disclosure Gazette No. Heisei 9-61772 (or in FIG. 5 of U.S. Pat. No. 5,739,943). The contents disclosed in the above gazettes should be included in this specification. The detailed configuration and operation of the polarization converter 12 are described later.

The signal light converted into the linear polarization by the polarization converter 12 propagates on an optical fiber 14 and enters a polarization beam splitter 16. The polarization beam splitter 16 splits the light from the optical fiber 14 into two orthogonal polarization components (e.g. TE and TM components) and outputs one component (e.g. TE component) toward an optical fiber 18. In the embodiment, the polarization beam splitter 16 functions as a polarizer for extracting a polarized component in a specific direction.

Most of the light propagated on the optical fiber 18 enters a photodetecting element 20 for receiving signals and the rest of the light is branched by an optical coupler 22 and enters a photodetecting element 24. A bandpass filter (BPF) 26 extracts a clock component of the signal out of an output of the photodetecting element 24. For instance, when the signal light from the optical transmission line is modulated at 10 Gb/s, the transmission center frequency of the BPF 26 becomes 10 GHz. The output of the BPF 26 reflects the intensity of a signal spectral component of the signal light. A control circuit 28 controls the polarization angle of the output light out of the polarization converter 12 so as to maximize the output of the BPF 26 according to the output of the BPF 26.

In this manner, the polarization converter 12 converts the polarization of the signal light from the optical transmission line into the linear polarization with such angle that maximizes the amplitude of the signal light (TE wave) on the optical fiber 18. That is, entered the photodetecting element 20 is the signal light which polarization mode dispersion is already removed. The polarization mode dispersion on the optical transmission line is thereby perfectly removed. Moreover, this configuration is capable of following the variation of the polarization mode dispersion on the optical transmission line at a sufficient speed, and therefore contributes to reduce the bit error rate and thus greatly improves the receiving performance.

As a method to control the polarization converter 12 by the control circuit 28, various methods for searching the maximum value are employable. For example, in a first method, the control value for the polarization converter 12 is slightly varied so to change the polarization angle of the output light of the polarization converter 12, and then the outputs of the BPF 26 are compared before and after the variation. The control value to lead a larger output of the BPF 26 is employed and then this control operation is performed sequentially afterward. In a second method, after the direction to increase the output of the BPF 26 is determined according to the obtained result from some initial operation based on the first method, the control value is successively varied in the direction until the output of the BPF 26 turns to decrease. It is also applicable that outputs of the BPF 26 corresponding to control values at respective points roughly divided within a controllable range are fetched all at once and the range to maximize the output of the BPF 26 is searched serially from the obtained result. The foregoing methods can be appropriately combined.

If there is no problem when the photodetecting elements 20 and 24 have the same photoelectric conversion performance, the output of the photodetecting element 20 should be applied to the BPF 26 also. In this case, the optical coupler 22 and photodetecting element 24 can be omitted.

Figure 2:
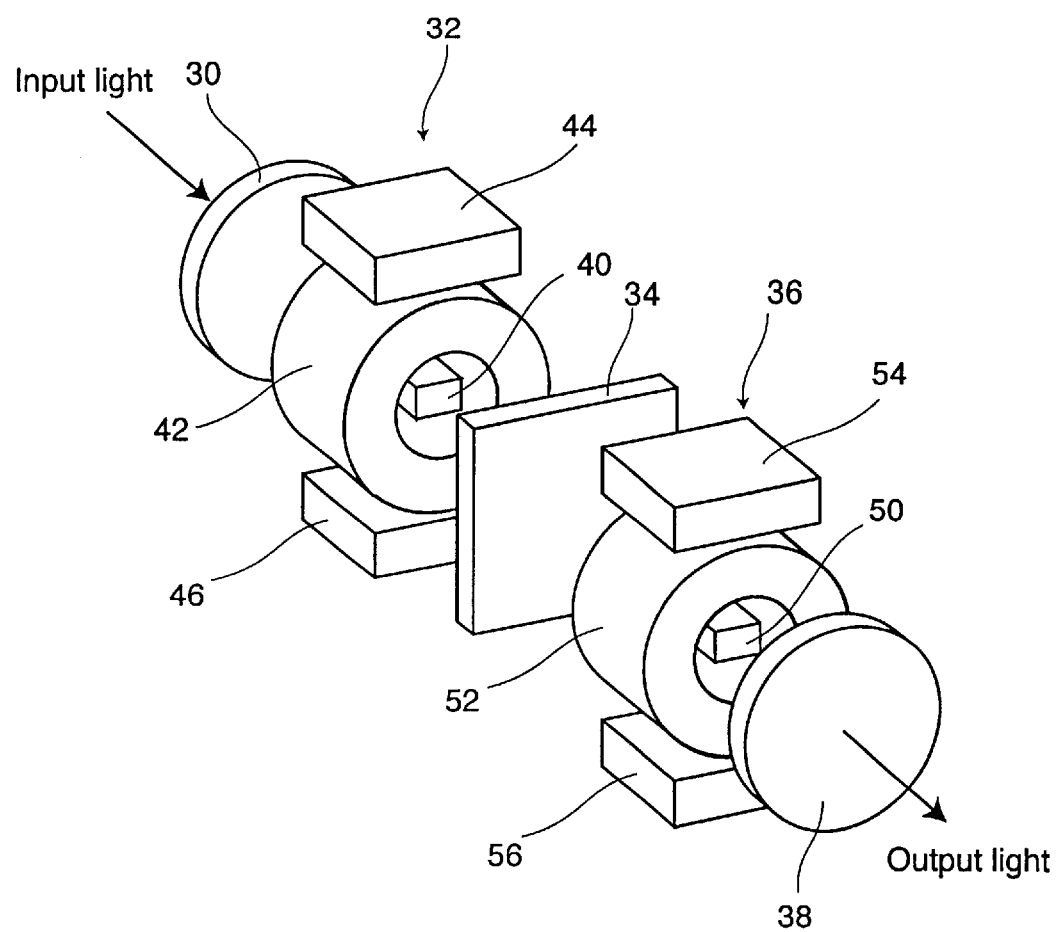
FIG. 2 shows a perspective view of a polarization converter 12.

The configuration and operation of the polarization converter 12 are explained below. FIG. 2 shows a perspective view of the polarization converter 12. The output light of the optical fiber 10 is converted to a collimated beam by a collimator lens 30 and enters a first polarization converter 32. The first polarization converter 32 moves the polarization of the input light in given condition along the same parallel of latitude. The output light of the first polarization converter 32 transmits a quarter wave plate 34 and enters a second polarization converter 36. The quarter wave plate 34 moves the polarization onto the equator by rotating it by 90 degree on the line connecting between a point to indicate vertical linear polarization and a point to indicate horizontal linear polarization on Poincare sphere. The second polarization converter 36 converts the polarization into a desired angle on the equator. The output light of the second polarization converter 36 is condensed by a condenser 38 and enters the optical fiber 14.

The configuration of the polarization converter 32 is as follows.

A Faraday rotator 40 is disposed on the optical axis. The Faraday rotator 40 comprises a garnet film indicating the Faraday effect. Disposed around the Faraday rotator 40 is a coil 42 for applying a magnetic field to the Faraday rotator 40 in the direction of the optical axis. The intensity of the applied magnetic field of the optical axis direction is adjusted by controlling the current flowing into the coil 42. On the outer side of the coil 42, magnets 44 and 46 are disposed for applying the constant magnetic field to the Faraday rotator 40 in the orthogonal direction relative to the optical axis. The magnetic field that the magnets 44 and 46 apply to the Faraday rotator 40 is set so strongly that the Faraday rotator 40 is magnetically saturated.

The polarization converter 36 comprises the same configuration with the polarization converter 32. Namely, the polarization converter 36 comprises a Faraday rotator 50, a coil 52 disposed around the Faraday rotator 50 for applying a magnetic field to the Faraday rotator 50 in the direction of the optical axis, and magnets 54, 56 disposed on the outer side of the coil 52 for applying a constant magnetic field to the Faraday rotator 50 in the orthogonal direction relative to the optical axis.

Although the details are disclosed in the aforementioned gazettes, in the polarization converters 32 and 36, the direction of the composite magnetic field applied to the Faraday rotators 40 and 50 can be changed from minus to plus by controlling the current applied to the coils 42 and 52 so as to vary within a range between +I and −I. In this way, the polarization converters 32 and 36 can respectively change polarization in the parallel direction on the Poincare sphere.

The polarization converter 32, theoretically, converts input light of any polarization among a circular polarization, a linear polarization and an elliptic polarization into the light of an elliptical polarization having axes in the vertical direction and horizontal direction. The wave plate 34 converts the elliptic polarization of the output light from the polarization converter 32 into a linear polarization, and the polarization converter 36 converts the linear polarization converted by the wave plate 34 into a linear polarization having a desired angle.

Figure 3:
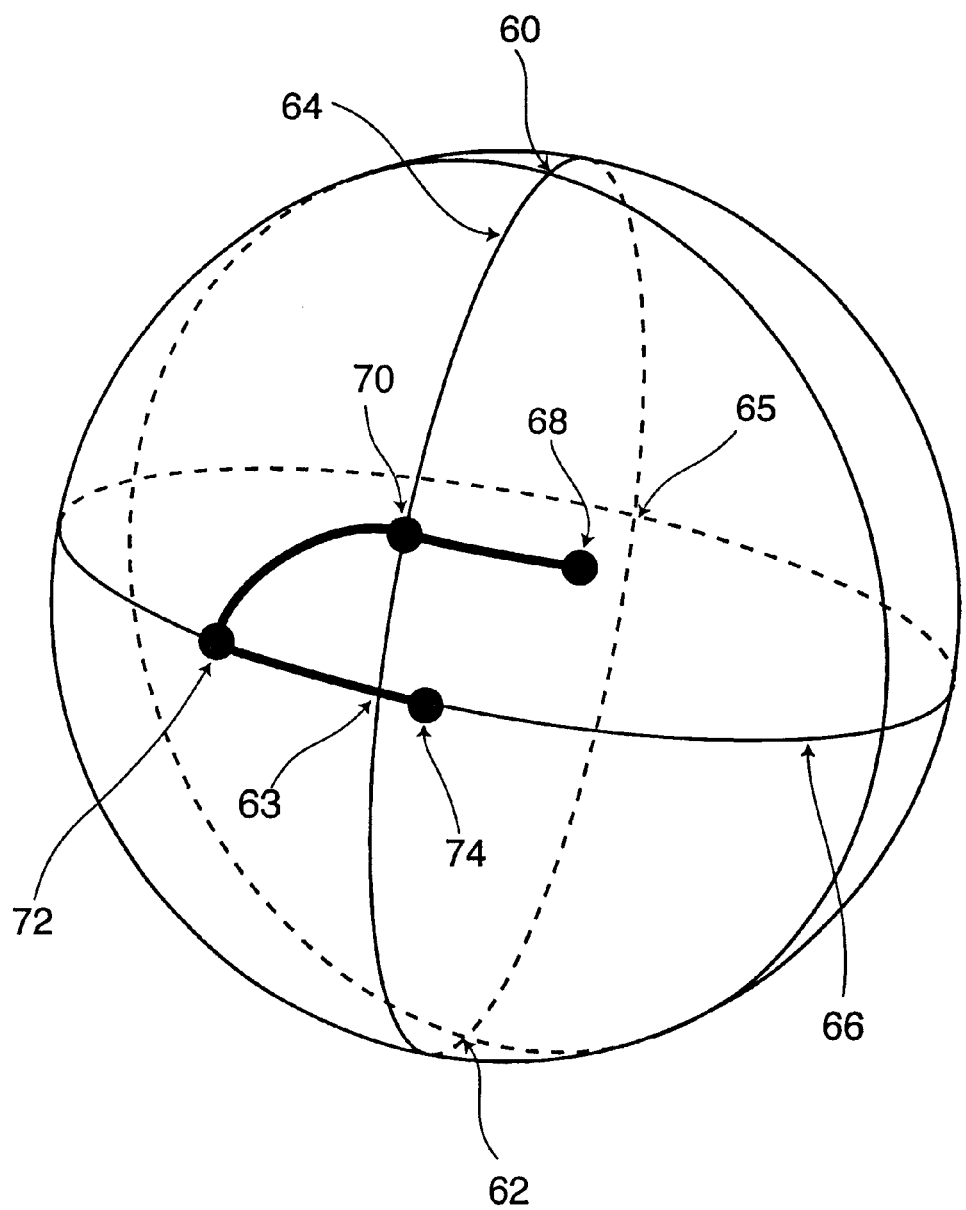
FIG. 3 illustrates a schematic diagram showing the polarization conversion of the polarization converter 12 on the Poincare sphere.

FIG. 3 is a schematic diagram showing the polarization conversion of the polarization converter 12 on a Poincare sphere. Reference numerals 60, 62, 63, 64, 65 and 66 denote the north pole, the south pole, the linear polarization in the vertical direction, the meridian, the linear polarization in the horizontal direction and the equator respectively. It is supposed that the polarization of the input light of the polarization converter 12 (i.e. the output light of the optical fiber 10) is located on the spot shown as the reference numeral 68. The first polarization converter 32 rotates the polarization of the input light (the reference numeral 68 in FIG. 3) so as to move a specified angle on the same parallel of latitude. Here, for convenience, it is supposed that the first polarization converter 32 moves the polarization to a location 70 on the meridian 64. The quarter wave plate 34 rotates the polarization of the location 70 to a 90 degree angle on a line connecting between a dot 63 of vertical polarization and a dot 65 of horizontal polarization so as to move onto a location 72 on the equator 66. The second polarization converter 36 moves the polarization of the location 72 on the equator 66 to a desired angle on the equator 66, for instance to a location 74. That is, the polarization moves from the location 68 finally to the location 74 through the locations 70 and 72. As described above, the polarization converter 12 according to the invention can convert the light of the given polarization state into the linear polarization with the desired angle.

The response rate of the polarization conversion by the Faraday rotators 40, 50 and the electromagnet composed of coils 42, 52 is about 100 kHz and thus it is fully possible to follow the variation of the polarization state changing faster than 10 millisecond.

In the foregoing embodiment, the component in the direction of the predetermined axis alone is detected out of the linear polarizations of the output light from the polarization converter 12, and the polarization converter 12 is controlled so as to maximize the detected component. However, it is also applicable that, in the linear polarization of the output from the polarization converter 12, optical intensities (or amplitudes of clock components) are detected and compared in both components of the predetermined direction and its orthogonal direction, and then the polarization converter 12 is controlled so that the light of the component in the predetermined direction becomes more intense compared to that of the component in the orthogonal direction.

In the above embodiment, although the BPF 26 extracts the clock components of the signal, it is also applicable that the BPF 26 extracts data components within a range between a frequency higher than a direct current and that adjacent to the clock component and exceeding the frequency of the clock component. However, this method increases noise and tends to be unstable. The transmission center frequency of the BPF 26 for instance can be changed to 5 GHz.

In the embodiment, it is possible to construct the configuration without moving parts, and consequently the high reliability can be obtained over a long period. Also, its response rate is fast enough to follow the fluctuation of the transmission condition on the optical transmission line, and thus practically it is highly effective and greatly improves the reception characteristics.

The polarization converter 12 can convert any polarization state on the Poincare sphere into any polarization state. However, there is a limit to the electric current allowed to flow into the Faraday rotators 40 and 50, and so the rotational quantity of the polarization is also limited. When it is employed in a transmission system which polarization turns around over and over on the Poincare sphere, the electric current applied to the coils 42 and 52 is likely to increase and exceed the limit value. If the electric current applied to the coils 42 and 52 exceeds the limit value, it becomes impossible to convert the polarization and thus compensate the polarization mode dispersion.

Figure 4:
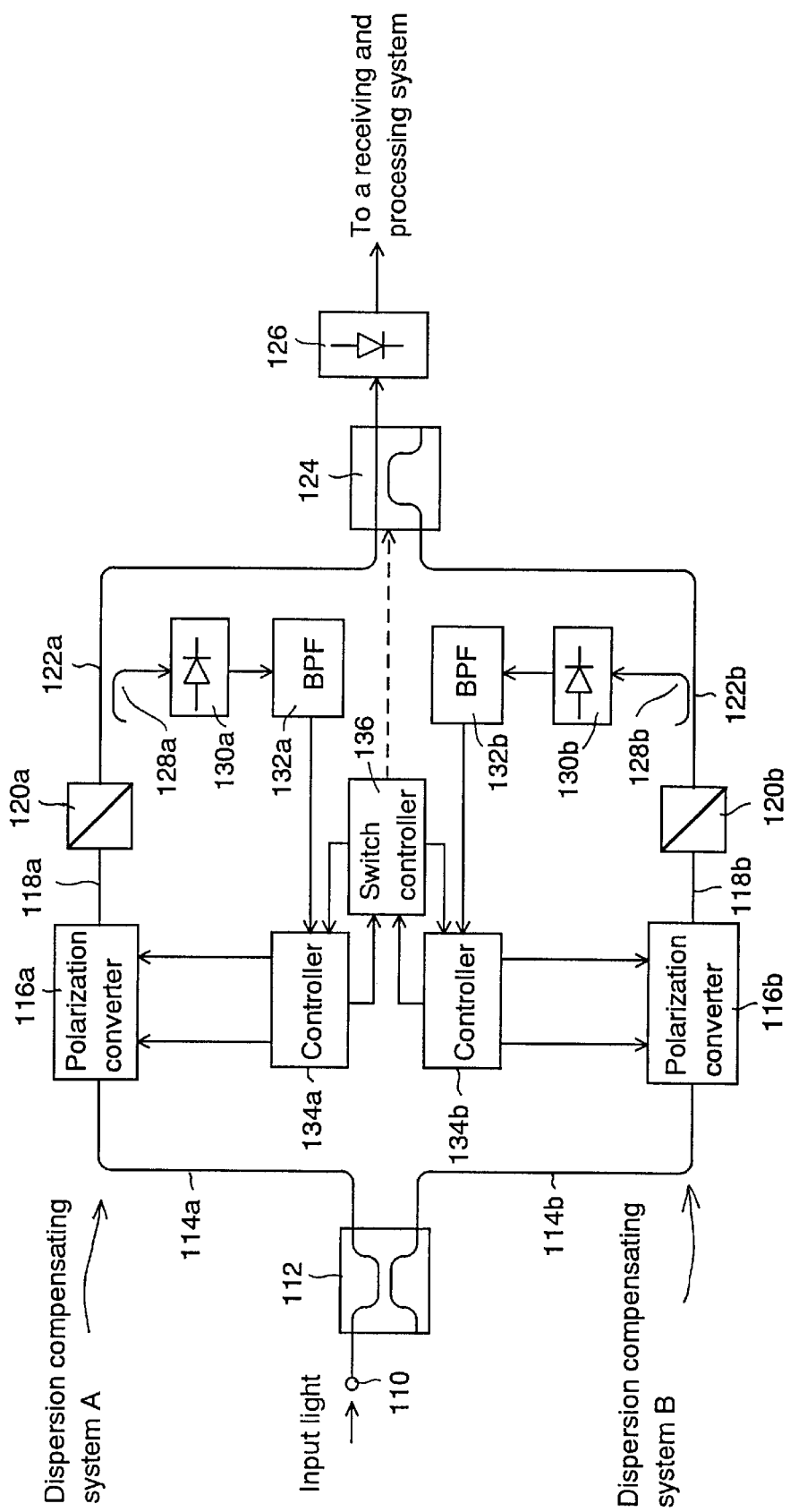
FIG. 4 shows a schematic block diagram of a second embodiment according to the invention.

FIG. 4 shows a schematic block diagram of a second embodiment according to the invention applicable to an optical transmission system which polarization fluctuates such degree to turn around repeatedly on a Poincare sphere.

The configuration and operation of the embodiment shown in FIG. 4 is explained below. A signal light from an optical transmission line enters a 3 dB optical coupler 112 through an input port 110 and is divided into two channels. The two portions of signal light divided by the 3 dB optical coupler 112 propagate on optical fibers 114a and 114b and enter polarization converters 116a an 116b respectively. Each of the polarization converters 116a and 116b comprises the same configuration with the polarization converter 12 and converts the polarization of the input light into linear polarizations with a desired angle.

The signal lights converted into the linear polarizations by the polarization converters 116a and 116b propagate on optical fibers 118a, 118b and enter polarization beam splitters 120a and 120b. Each of the polarization beam splitters 120a and 120b splits the light from the optical fibers 118a and 118b into two orthogonal polarization components (e.g. TE and TM components) and outputs one portion (e.g. the TE component) toward optical fibers 122a and 122b. In the embodiment, the polarization beam splitters 120a and 120b function as polarizers for extracting polarization components of a specific direction.

Most of the lights propagated on the optical fibers 122a and 122b enter two input ports of an optical switch 124 respectively. The optical switch 124 selects one input light out of the lights entered the two input ports and applies it to a photodetecting element 126 for receiving signals. The photodetecting element 126 converts the input light into an electric signal and applies it to a receiving and processing system, which is not shown in FIG. 4.

The rest of the lights propagated on the optical fibers 122a and 122b are branched by optical couplers 128a and 128b and enter photodetecting elements 130a and 130b respectively. BPFs 132a and 132b, similarly to the BPF 26, extract clock components of the signals from the outputs of the photodetecting elements 130a and 130b. Control circuits 134a and 134b control the polarization angles of the output lights from the polarization converters 116a and 116b so as to maximize the outputs of the BPFs 132a and 132b according to the output of the BPFs 132a and 132b.

This embodiment comprises two polarization mode compensating systems, one is composed of a polarization converter 116a, a photodetecting element 130a, a BPF 132a and a control circuit 134a and the other is composed of a polarization converter 116b, a photodetecting element 130b, a BPF 132b and a control circuit 134b. These two compensating systems individually operate in the same way with the embodiment shown in FIG. 1 to compensate the polarization mode dispersion of the input light. The optical switch 124 selects one of the compensated results of the polarization mode dispersions by the two compensating systems and applies it to the photodetecting element 126.

The optical switch 124 preferably comprises an element having no polarization dependence. The optical switch 124 for example has a configuration in which a half wave plate is inserted in the middle of a directional coupler comprising a lithium niobate waveguide.

The control circuits 134a and 134b comprise two kinds of operation modes, one (a restriction priority mode) gives priority to restrict the driving currents for the polarization converters 116a and 116b not to make a round on the Poincare sphere over to control the driving currents for the polarization converters 116a and 116b according to the outputs of the BPFs 132a and 132b, and the other (a follow-up priority mode) gives priority to control the driving currents for the polarization converters 116a and 116b according to the outputs of the BPFs 132a and 132b over to restrict the driving currents. In the restriction priority mode, when the driving currents for the polarization converters 116a and 116b exceed a limit value, the control circuits 134a and 134b restart the driving currents from zero (or from an electric current being within the limit value and corresponding to the same phase position on the Poincare sphere) in order to control the driving currents of the polarization converters 116a and 116b so as to maximize the outputs of the BPFs 132a and 132b. On the other hand, in the follow-up priority mode, the control circuits 134a and 134b keep to control the driving current of the polarization converters 116a and 116b so as to maximize the outputs of the BPFs 132a and 132b even if the driving currents for the polarization converters 116a and 116b exceed the limit value, and informs a switch control circuit 136 that the driving currents exceed the limit value.

The switch control circuit 136 controls the operation mode of the control circuits 134a and 134b as well as controls the switching of the optical switch 124. To put it concretely, the switch control circuit 136 is initialized so as to control one control circuit 134a (or 134b) to operate in the follow-up priority mode and the other control circuit 134b (or 134a) in the restriction priority as well as the optical switch 124 to select the input light from the optical fiber 122a (or 122b). The control circuit 134a (or 134b) controls the driving current of the polarization converter 116a (or 116b) so as to maximize the output of the BPF 132a (or 132b) regardless of the limit value, and the control circuit 134b (or 134a) restricts the driving current not to exceed the limit value while controlling the driving current of the polarization converter 116b (or 116a) so as to maximize the output of the BPF 132b (or 132a). The optical switch 124 selects the input light from the optical fiber 122a and thereby the signal light which polarization mode dispersion is compensated at the polarization converter 116a (or 116b) enters the photodetecting element 126.

When the switch control circuit 136 is informed from the control circuit 134a (or 134b) that the driving current exceeds the limit value, it controls the optical switch 124 to select the input light from the optical fiber 122b (or 122a), the control circuit 134b (or 134a) to operate in the follow-up priority mode, and the control circuit 134a (or 134b) to operate in the restriction priority mode after initializing it (e.g. resetting to zero the driving current to be output).

As described above, in the embodiment, the spare system that takes priority to keep the driving current within the limit value is provided for compensating the polarization mode dispersion of the input signal light. Even if the driving current of the presently used system exceeds the limit value, the signal light with its polarization mode dispersion compensated can be applied to the photodetecting element 126 without difficulty by rapidly switching to the spare system accordingly. In this manner, the bit error rate is reduced and, hence, the receiving performance is greatly improved without any loss due to the switching of the compensation systems. If the outputs of the BPFs 132a and 132b are still controlled to increase even if the driving currents of the polarization converters 116a and 116b exceed the limit value, the compensation of the polarization mode dispersion becomes impossible sooner or later. In this embodiment, however, such harmful effect is completely solved.

In the embodiment, the optical switch 124 comprises an optical switch nonpolarized by inserting a half wave plate in the middle of a directional coupler of a lithium niobate waveguide. The optical switch 124 is required to have a quite high extinction rate for decreasing coherent crosstalk between the transmission signal lights respectively propagated on the two different routes.

The coherent crosstalk, however, can be prevented if polarization preserving systems are disposed between the polarization beam splitter 120a and the optical switch 124 as well as between the polarization beam splitter 120b and the optical switch 124 in order to orthogonalize the polarization directions of the input lights of the optical switch 124. In this case, the optical switch 124 can be an optical switch comprising a lithium niobate waveguide with a low extinction ratio.

As described above, the embodiment shown in FIG. 4 is applicable to such optical transmission system that the polarization mode dispersion occurs for rotating on the Poincare sphere several times.

Similarly to the BPF 26, the BPFs 132a and 132b can extract data components within a range between a frequency higher than a direct current and that adjacent to the clock component and exceeding the frequency of the clock component. However, this method increases noise and tends to be unstable.

Figure 5:
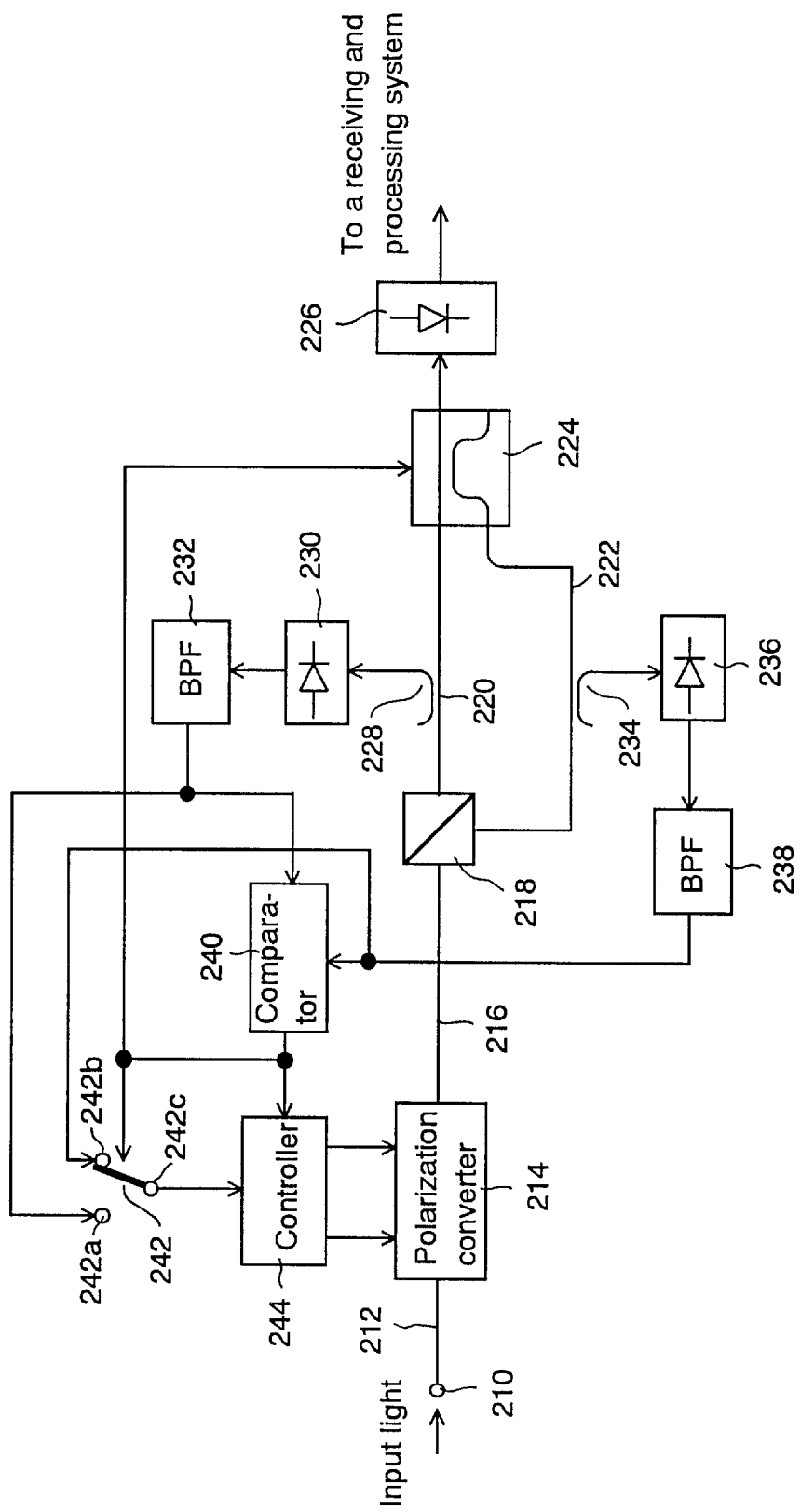
FIG. 5 shows a schematic block diagram of a third embodiment according to the invention.

FIG. 5 shows a schematic block diagram of a third embodiment according to the invention. In the embodiments shown in FIGS. 1 and 4, the polarization beam splitters 16, 120a and 120b extract the polarization components of the predetermined direction (the principal axis direction). Consequently, when a polarization variation is occurred to decrease the polarization component of the principal axis and increase the polarization component orthogonal to the principal axis, it is very likely that the polarization mode dispersion can not be compensated temporarily. The embodiment shown in FIG. 5 can deal with such situation.

The configuration and operation of the embodiment shown in FIG. 5 is explained below. A signal light from an optical transmission line enters an optical fiber 212 through an input port 210, propagates on the optical fiber 212 and inputs a polarization converter 214. The polarization converter 214 comprises the same configuration with the polarization converter 12 and converts the input light of arbitrary polarization into a linear polarization with a desired angle. The signal light converted into the linear polarization by the polarization converter 214 propagates on an optical fiber 216 and enters a polarization beam splitter 218. The polarization beam splitter 218 splits the light from the optical fiber 216 into two orthogonal polarization components (e.g. TE and TM components) and outputs one component (e.g. the TE component) toward an optical fiber 220 and the other (e.g. the TM component) toward an optical fiber 222.

Most of the light propagated on the optical fiber 220 enters a photodetecting element 226 for receiving signals through an optical switch 224, and the rest is branched by an optical coupler 228 and enters a photodetecting element 230. A BPF 232, similarly to the BPF 26, extracts the clock component of the signal from the output of the photodetecting element 230.

Similarly, most of the light propagated on the optical fiber 222 enters a photodetecting element 226 for receiving signals through an optical switch 224, the rest is branched by an optical coupler 234 and enters a photodetecting element 236. A BPF 238, similarly to the BPF 232, extracts the clock component of the signal from the output of the photodetecting element 236.

A comparative circuit 240 compares the outputs from the BPFs 232 and 238, and then, as described later, switches the polarization control using the output of the BPF 232 or that of the BPF 238 according to the compared result. The outputs of the BPFs 232 and 238 are also applied to selective contacts 242a and 242b of a switch 242 respectively. A common contact 242c of the switch 242 connects to an input of a control circuit 244. The switch 242 selects one of the outputs of the BPFs 232 and 238 according to the compared result of the comparative circuit 240 and applies it to the control circuit 244.

The control circuit 244 generates a driving current for the polarization converter 214 to maximize the level of signal from the common contact 242c of the switch 244 according to the signal and applies it to the polarization converter 214. The control circuit 244 resets the control operation to maximize the output of the BPF 232 or BPF 238 according to the switching of the switch 242 by the comparative circuit 240. This is because the switching of the switch 242 interrupts the continuity of the control operation by the control circuit 244. When the driving current value for the polarization converter 214 can be continuously controlled through the switching of the switch 242, such reset of the control operation is unnecessary.

The comparative circuit 240 generally compares the outputs of the BPFs 232 and 238, and switches the switch 242 according to which is larger. That is, when the output of the BPF 232 is larger than that of the BPF 238, the comparative circuit 240 controls the switch 242 to select the output of the BPF 232 and contrarily when the output of the BPF 238 is larger than that of the BPF 232, the comparative circuit 240 controls the switch 242 to select the output of the BPF 238.

It is possible that the switching between the polarization control with the output of the BPF 232 and that with the output of the BPF 238 comprises hysteresis characteristics in order to prevent the frequent switching of the switch 242. If the output of the BPF 232 relatively changes its state in the direction from smaller to larger than the output of the BPF 238, the comparative circuit 240 controls the switch 242 to select the output of the BPF 232 when the output of the BPF 232 becomes larger exceeding a predetermined value than that of the BPF 238. If the outputs of the BPFs 232 and 238 have inverse relation, the comparative circuit 240 controls the switch 242 to select the output of the BPF 238 when the output of the BPF 232 becomes larger exceeding a predetermined value than that of the BPF 232.

The comparative circuit 240 also switches the optical switch 224 synchronizing with the switching of the switch 242. Namely, the comparative circuit 240 controls the optical switch 224 to select the input light from the optical fiber 220 when it controls the switch 242 to select the output of the BPF 232, and inversely the comparative circuit 240 controls the optical switch 224 to select the input light from the optical fiber 222 when it controls the switch 242 to select the output of the BPF 238.

The optical switch 224 comprises an optical switch non-polarized by inserting a half wave plate in the middle of a directional coupler of a lithium niobate waveguide. However, similarly to the former embodiment, when the optical fibers 220 and 222 comprise polarization maintaining fibers and the two lights entering the optical switch 224 are mutually orthogonal, the coherent crosstalk does not occur. In this case, the optical switch 224 can be an optical switch comprising a lithium niobate waveguide with a low extinction ratio.

In the embodiment shown in FIG. 5, when the signal of the principal axis direction becomes small and the polarization component orthogonal to the direction of the principal axis become large due to the variation of the condition of the optical transmission line, the compensation of the polarization mode dispersion can be continuously performed by following the component of the new principal axes. In short, even if the principal axes changes, the compensation of the polarization mode dispersion can be continuously performed without difficulty.

In the embodiment shown in FIG. 5, it is also applicable that the BPFs 232 and 238 extract the data components within a range between a frequency higher than a direct current and that adjacent to the clock component and exceeding the frequency of the clock component. However, this method increases noise and tends to be unstable. The transmission center frequency of the BPFs 232 and 238, for instance, can be set at 5 GHz.

Figure 6:
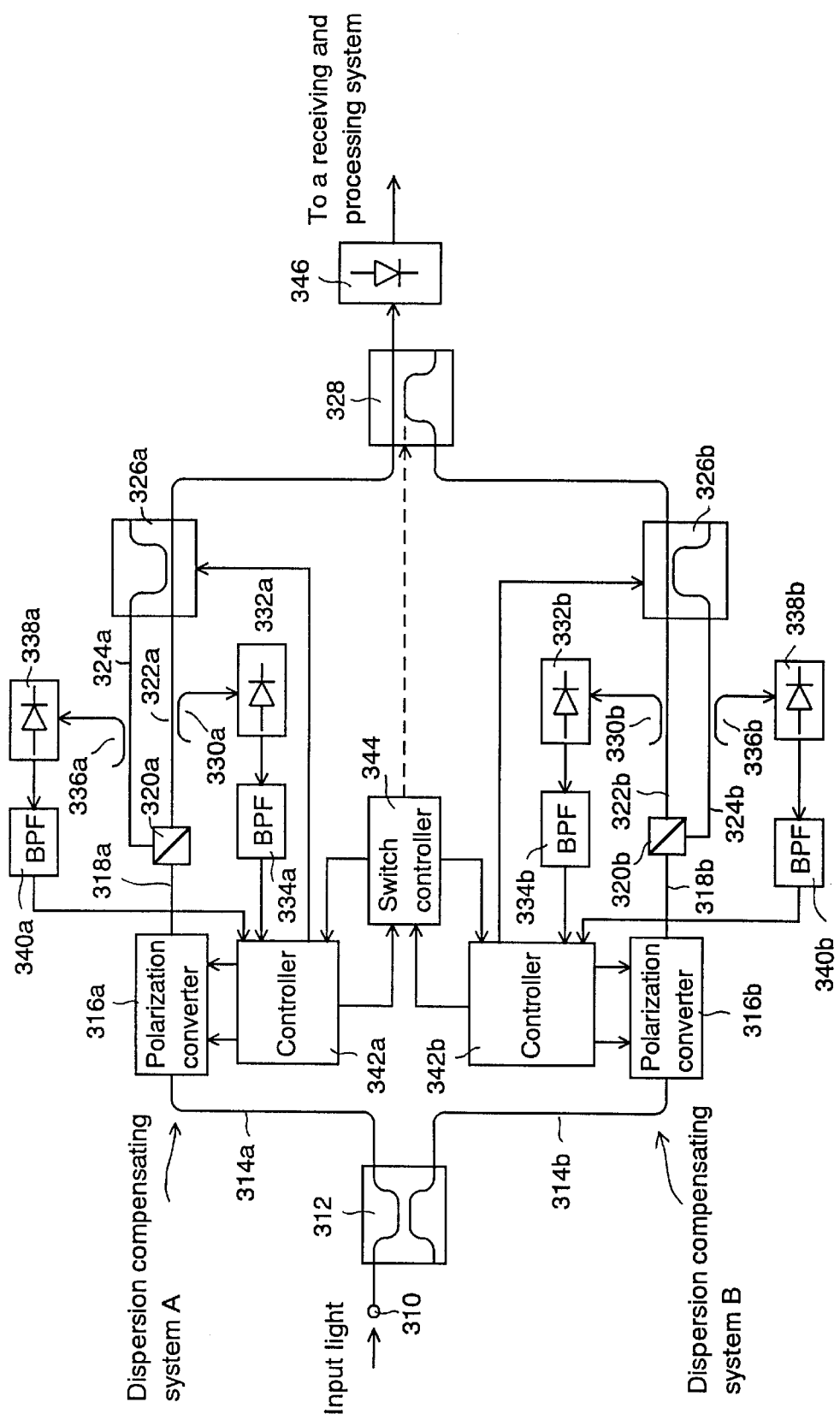
FIG. 6 shows a schematic block diagram of a fourth embodiment according to the invention.

FIG. 6 shows a schematic block diagram of an embodiment in which the embodiments shown in FIGS. 4 and 5 are combined. This embodiment, similarly to the embodiment shown in FIG. 4, comprises two polarization mode dispersion compensating systems A and B both having fundamentally the same configuration. Each of the compensating systems A and B, similarly to the embodiment shown in FIG. 5, compares both levels of a component of the principal axis direction and that of the orthogonal direction to the principal axis direction, and compensates the polarization mode dispersion by the component with the larger level. This configuration is applicable to both types of an optical transmission system in which a polarization of a transmission signal light repeatedly rotates on a Poincare sphere and an optical transmission system in which its principal axis varies, so as to compensate the polarization mode dispersion without difficulty.

The configuration and operation of the embodiment shown in FIG. 6 is explained below. A signal light from an optical transmission line enters a 3 dB optical coupler 312 through an input port 310 and is divided into two systems A and B. The two portions of the signal lights divided at the 3 dB optical coupler 312 propagate on optical fibers 314a and 314b and enter polarization converters 316a and 316b respectively. Each of the polarization converters 316a and 316b comprises the same configuration with the polarization converters 12, 116a and 116b and converts the polarization of the incident light into a linear polarization with a desired angle.

The signal light converted into the linear polarization by the polarization converter 316a propagates on an optical fiber 318a and enters a polarization beam splitter 320a. The polarization beam splitter 320a divides the light from the optical fiber 318a into two orthogonal polarization components (e.g. TE and TM components) and outputs one (e.g. the TE component) toward an optical fiber 322a and the other (e.g. the TM component) to an optical fiber 324a.

Most of the light propagated on the optical fiber 322a enters one port of an optical switch 328 through an optical switch 326a, and the rest is branched by an optical coupler 330a and enters a photodetecting element 332a. A BPF 334a, similarly to the BPFs 26 and 132a, extracts the clock component of the signal from the output of the photodetecting element 332a.

Similarly, most of the light propagated on the optical fiber 324a enters the other port of the optical switch 328 through the optical switch 326a, and the rest is branched by an optical coupler 336a and enters a photodetecting element 338a. A BPF 340a, similarly to the BPFs 232 and 238, extracts the clock component of the signal from the output of the photodetecting element 338a.

A control circuit 342a comprises the same functions with the comparative circuit 240, switch 242 and control circuit 244 in the embodiment shown in FIG. 5. The control circuit 342a, similarly to the control circuit 134a and 134b, can operate either of the follow-up priority mode or the restriction priority mode, and send the information whether the driving current for the polarization converter 316a exceeds a limit value to a switch control circuit 344.

The configuration and operation of the system A was explained above. The configuration and operation of the system B is also explained by simply replacing the symbols 'a' attached to the reference numerals with symbols 'b' in the foregoing description. The detailed explanation of the configuration and operation of the system B is omitted accordingly.

The switch control circuit 344 instructs the control circuits 342a and 342b in which mode they should operate, the follow-up priority mode or the restriction priority mode. The switch control circuit 344 controls the control circuits 342a, 342b and optical switch 328 in the same way of the switch control circuit 136. That is, when the optical switch 328 should select the compensated result of the polarization mode dispersion of the system A, the switch control circuit 344 controls the optical switch 328 to select the signal light from the optical switch 326a, the control circuit 342a to operate in the follow-up priority mode and the control circuit 342b to operate in the restriction priority mode. When the driving current for the polarization converter 316a rotated more than once on the Poincare sphere in the system A, the switch control circuit 344 controls the optical switch 328 to select the signal light from the optical switch 326b, the control circuit 342a to operate in the restriction priority mode after initializing it and the control circuit 342b to operate in the follow-up priority mode.

The signal light selected by the optical switch 328 enters a photodetecting element 346 for receiving process. The photodetecting element 346 outputs an electric signal which amplitude varies according to the intensity variation of the input light. The output of the photodetecting element 346 is applied to a receiving and processing system.

Each of the optical switches 326a, 326b and 328 comprises optical switch nonpolarized by inserting a half wave plate in the middle of a directional coupler of a lithium niobate waveguide. However, similarly to the former embodiments, when the optical fibers 322a, 322b, 324a and 324b comprise polarization maintaining fibers, and the two lights entering the optical switches 326a and 326b become mutually orthogonal, the coherent crosstalk does not occur. In this case, the optical switches 326a and 326b can be optical switches comprising lithium niobate waveguides with a low extinction ratio.

From the foregoing, the embodiment shown in FIG. 6 has both advantages of the embodiments shown in FIGS. 4 and 5. That is, the embodiment shown in FIG. 6 is applicable to the optical transmission system which polarization rotates on the Poincare sphere several times, and also capable to continuously compensate the polarization mode dispersion even if the principal axis is changed.

The lithium niobate waveguides are used as the optical switches 124, 224, 326a, 326b and 328. However, it is also possible to employ optical switches combining two electroabsorption optical modulators and a 3 dB coupler.

In the embodiments shown in FIGS. 4 and 6, the compensated results of the polarization mode dispersion in the two systems are selected with optical switch. However, it is also applicable that the compensated results are separately sent to respective photodetecting elements and converted into electric signals, and then the outputs of the photodetecting elements are selected by an electric switch.

In the embodiment shown in FIG. 6, similarly to the former embodiments, the BPFs 334a, 334b, 340a and 340b can also extract data components within a range between a frequency higher than a direct current and that adjacent to the clock component and exceeding the frequency of the clock component. However, this method increases noise and tends to be unstable. The transmission center frequency of the BPFs 334a, 334b, 340a and 340b, for instance, can be set to 5 GHz accordingly.

Figure 7:
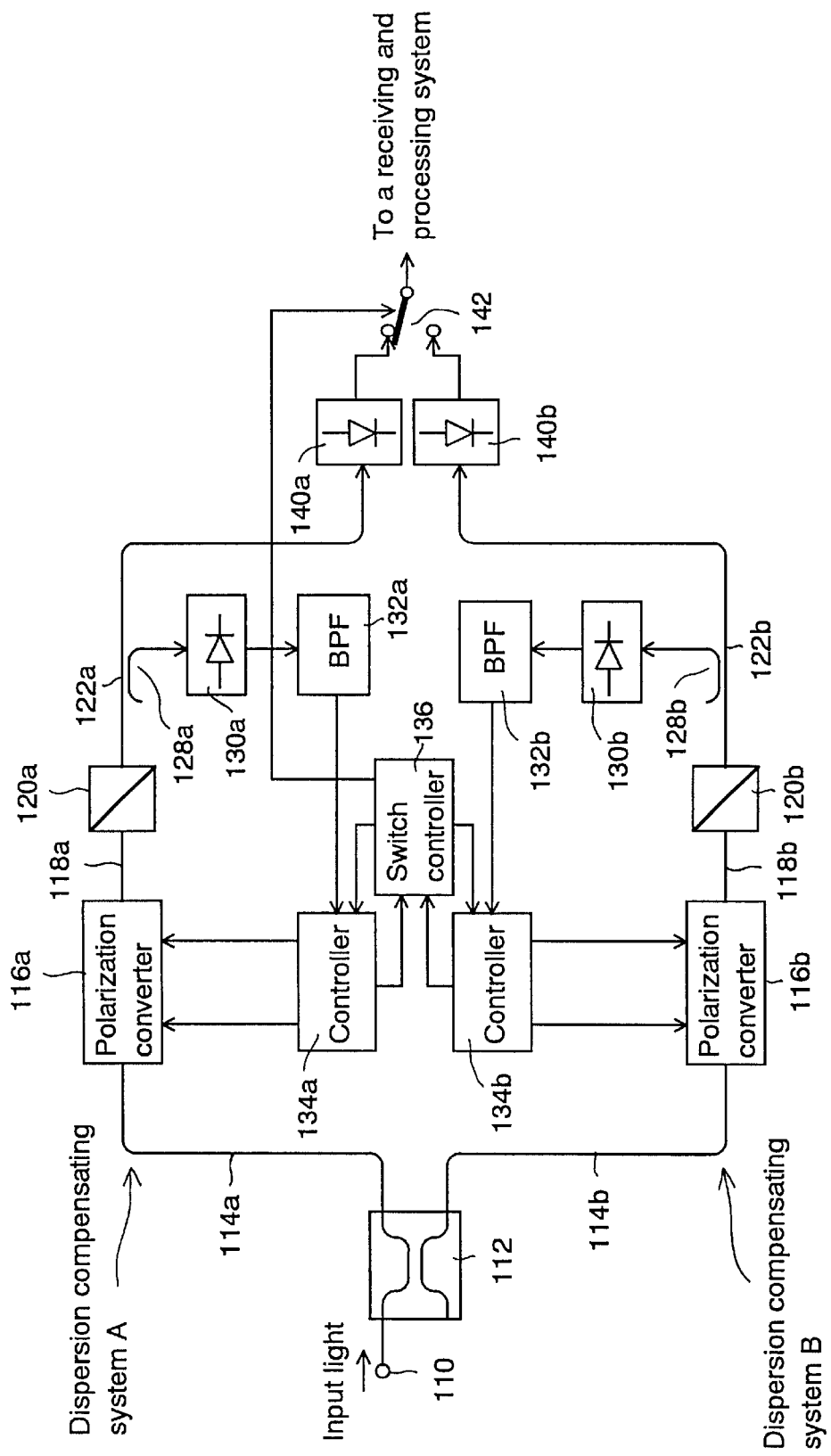
FIG. 7 shows a schematic block diagram of a fifth embodiment according to the invention.
Figure 8:
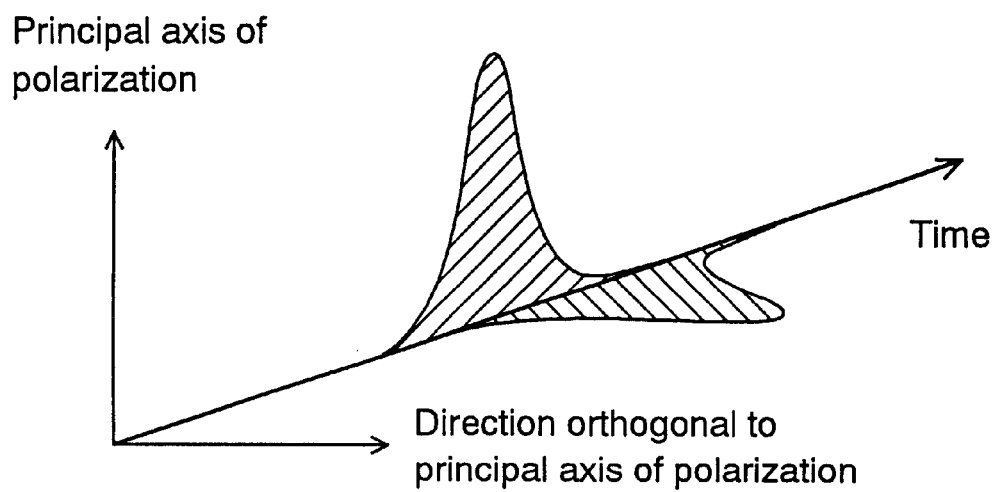
FIG. 8 shows a schematic diagram of the polarization mode dispersion.

In the embodiments shown in FIGS. 4, 5 and 6, the optical switches 124, 224 and 328 select the optical lights first and then the photodetecting elements 126, 226 and 346 convert them into the electric signals. However, it is also applicable that, firstly, each of the photodetecting elements separately converts the signal light into the electric signal, and then an electric switch selects outputs of the respective photodetecting elements. FIG. 7 shows a schematic block diagram of an embodiment in which the embodiment shown in FIG. 4 is modified in such manner. Identical elements are labeled with reference numerals common to those in FIG. 4.

Photodetecting elements 140a and 140b convert the signal lights from the optical fibers 122a and 122b into electric signals respectively and apply the obtained electric signals to respective selective contacts of an electric switch 142. The electric switch 142 selects the output of the photodetecting element 140a or 140b according to a switching control signal from the switch control circuit 136 and applies to the following receiving and processing circuits.

As already described referring to the embodiment shown in FIG. 1, in the configuration shown in FIG. 7, having applied the outputs of the photodetecting elements 140a and 140b to the BPFs 132a and 132b, the optical couplers 128a, 128b and photodetecting elements 130a, 130b can be omitted. With regard to the embodiments shown in FIGS. 5 and 6, the splitter and photodetecting element relating to one polarization component can be omitted.

The embodiment shown in FIG. 7 has an advantage that it does not require the high speed-optical switches 124, 224 and 328.

As readily understandable from the aforementioned, according to the invention, the polarization converter with the Faraday rotator is employed so that the fast polarization variation can be followed and thus the polarization mode dispersion can be compensated. Since no mechanical movable component is employed, it can be used over a long period as well as realize a high reliability. Moreover, the compensating amount of the polarization mode dispersion can be changed according to the amount of the polarization mode dispersion of the incident light, and, hence, it is possible to adaptively compensate the polarization mode dispersion according to the transmission condition of the optical transmission line.

While the invention has been described with reference to the specific embodiment, it will be apparent to those skilled in the art that various changes and modifications can be made to the specific embodiment without departing from the spirit and scope of the invention as defined in the claims.

What is claimed is:

1. An apparatus for compensating a polarization mode dispersion of input signal light, comprising:

a polarization converter for converting polarization of the input signal light into a linear polarization;

a polarization extractor for extracting at least one polarization component out of two mutually orthogonal components in output light of the polarization converter;

a signal extractor for extracting a signal component from an output light of the polarization extractor; and a controller for controlling the polarization converter so as to increase an output of the signal extractor according to the output of the signal extractor, wherein the signal extractor comprises a photodetector for converting the output light of the one Polarization component extracted from the polarization extractor into an electric signal, and an extractor for extracting the signal component from an output of the photodetector and applying it to the controller and wherein the extractor comprises an electric filter for extracting the signal component comprising an intensity of a clock component of the input signal light.

2. An apparatus for compensating a polarization mode dispersion of input signal light, comprising:

a polarization converter for converting polarization of the input signal light into a linear polarization;

a polarization extractor for extracting at least one polarization component out of two mutually orthogonal components in output light of the polarization converter;

a signal extractor for extracting a signal component from an output light of the polarization extractor; and a controller for controlling the polarization converter so as to increase an output of the signal extractor according to the output of the signal extractor, wherein the signal extractor comprises a photodetector for converting the output light of the one polarization component extracted from the polarization extractor into an electric signal, and an extractor for extracting the signal component from an output of the photodetector and applying it to the controller and wherein the signal extractor comprises a first photodetector for converting the output light of the one polarization component extracted from the polarization extractor into an electric signal, a first extractor for extracting a first signal component from an output of the first photodetector, a second photodetector for converting an output light of the other polarization component extracted from the polarization extractor, a second extractor for extracting a second signal component from the second photodetector, a comparator for comparing outputs of the first and second extractors, and a selector for selecting one of the outputs from the first and second signal extractors and applying it to the controller according to the compared result of the comparator, the polarization mode dispersion compensating apparatus further comprising a signal selector for selecting a signal to be carried on either one of the polarizations from the polarization extractor according to the compared result of the comparator.

3. The polarization mode dispersion compensating apparatus of claim 2 wherein the first and second extractors respectively comprise an electric filter for extracting its respective first or second signal component each comprising an intensity of a clock component of the input signal light.

4. The polarization mode dispersion compensating apparatus of claim 2 wherein the first and second extractors respectively comprise an electric filter for extracting its respective first or second signal component each comprising a mean optical intensity of the input signal light.

5. The polarization mode dispersion compensating apparatus of claim 2 wherein the signal selector comprises an optical switch for selecting the output light of one of the polarizations from the polarization extractor.

6. An apparatus for compensating a polarization mode dispersion of input signal light, comprising:

a polarization converter for converting polarization of the input signal light into a linear polarization;

a polarization extractor for extracting at least one polarization component out of two mutually orthogonal components in output light of the polarization converter;

a signal extractor for extracting a signal component from an output light of the polarization extractor; and a controller for controlling the polarization converter so as to increase an output of the signal extractor according to the output of the signal extractor, wherein the polarization converter comprises a first converter for moving the polarization of the input signal light along a parallel of latitude on a Poincare sphere using Faraday rotation, a wave plate for moving output light of the first converter onto an equator of the Poincare sphere, and a second converter for moving polarization of output light of the wave plate along the equator of the Poincare sphere.

7. The polarization mode dispersion compensating apparatus of claim 6, wherein the first and second converters respectively comprise a Faraday element, a magnet generator for applying a magnetic field in a direction of an optical axis of the Faraday element to the Faraday element according to a driving current from the controller, and a magnet for applying a magnetic field, which is in a direction orthogonal to the optical axis of the Faraday element and which magnetically saturates the Faraday element, to the Faraday element.

8. An apparatus for compensating polarization mode dispersion of input signal light, comprising:

an optical divider for dividing the input signal light into two portions;

a first dispersion compensator having a first polarization converter for converting a polarization of one output light portion from the optical divider into a linear polarization, a first polarization extractor for extracting a first predetermined polarization component from output light of the first polarization converter, and a first controller for controlling the polarization conversion of the first polarization converter so as to increase intensity of output light from the first polarization extractor;

a second dispersion compensator having a second polarization converter for converting a polarization of the other output light portion from the optical divider into a linear polarization, a second polarization extractor for extracting a second predetermined polarization component from output light of the second polarization converter, and second controller for controlling the polarization conversion of the second polarization converter so as to increase intensity of output light from the second polarization extractor such that a control signal for the second polarization converter is restricted within a predetermined restricted region, a signal selecting switch for selecting one output of the first and second dispersion compensators and at first selecting the output of the first dispersion compensator, and a switch controller for monitoring controlled conditions of the first and second polarization converters by the first and second controllers and controlling the fist and second controllers as well as the signal selecting switch according to the monitored result, the switch controller controlling the signal selecting switch to select the output of the second dispersion compensator and also to direct the second controller to control the polarization conversion of the second polarization converter so as to increase the output light from the second polarization extractor regardless of the restricted region of the control signal for the second polarization converter when a control signal of the first controller for the first polarization converter exceeds the restricted region.

9. The polarization mode dispersion compensating apparatus of claim 8 wherein when the switch controller directs the second controller to control the polarization conversion of the second polarization converter so as to increase the output light from the second polarization extractor regardless of the restricted region of the control signal for the second polarization converter, and the switch controller further directs the first controller to control the polarization conversion of the first polarization converter so as to increase the output light of the first polarization extractor such that the control signal for the first polarization converter is restricted within a second predetermined restricted region.

10. The polarization mode dispersion compensating apparatus of claim 8 wherein the first and second controllers respectively control the polarization conversions of the first and second polarization converters so as to increase a respective signal component obtained from the predetermined polarization components extracted by the first and second polarization extractors.

11. The polarization mode dispersion compensating apparatus of claim 10 wherein the respective signal components each comprises a signal indicating an intensity of a clock component of the input signal.

12. The polarization mode dispersion compensating apparatus of claim 10, wherein the first controller comprises a first photodetector for converting one polarization component of two orthogonal polarization components from the first polarization extractor into an electric signal, a first signal extractor for extracting a signal component from an output of the first photodetector, a second photodetector for converting the other polarization component of the two orthogonal polarization components from the first polarization extractor into an electric signal, a second signal extractor for extracting a signal component from an output of the second photodetector, a first comparator for comparing outputs from the first and second signal extractors, and a first selector for selecting one of the outputs from the first and second signal extractors according to the compared result of the first comparator, the first controller controlling the polarization conversion of the first polarization converter so as to increase an output of the first selector;

wherein the second controller comprises a third photodetector for converting one polarization component of two orthogonal polarization components from the second polarization extractor, a third signal extractor for extracting a signal component from an output of the third photodetector, a fourth photodetector for converting the other polarization component of the two orthogonal polarization components from the second polarization extractor into an electric signal, a fourth signal extractor for extracting a signal component from an output of the fourth photodetector, a second comparator for comparing outputs of the third and fourth signal extractors, and a second selector for selecting one of the outputs from the third and fourth signal extractors according to the compared result of the second comparator, the second controller controlling the polarization conversion of the second polarization converter to increase an output of the second selector;

wherein the first dispersion compensator further comprises a first signal selector for selecting a signal to be carried on either one of the respective polarization components from the first polarization extractor according to the compared result of the first comparator; and wherein the second dispersion compensator further comprises a second signal selector for selecting a signal to be carried on either one of the respective polarization components from the second polarization extractor according to the compared result of the second comparator.

13. The polarization mode dispersion compensating apparatus of claim 12 wherein the first signal selector comprises an optical switch for selecting the output light of either one of the respective polarization components from the first polarization extractor, and the second signal selector comprises an optical switch for selecting the output light of either one of the respective polarization components from the second polarization extractor.

14. The polarization mode dispersion compensating apparatus of claim 8 wherein the first and second polarization converters respectively comprise an apparatus for rotating the polarization of input light with a Faraday rotation.

15. The polarization mode dispersion compensating apparatus of claim 8 wherein the first and second polarization converters respectively comprise a first converter for moving the polarization of the input signal light along a parallel of latitude on the Poincare sphere using Faraday rotation, a wave plate for moving output light of the first converter onto the equator of the Poincare sphere, and a second converter for moving polarization of output light of the wave plate along the equator of the Poincare sphere.

16. The polarization mode dispersion compensating apparatus of claim 15 wherein the first and second polarization converters respectively comprise a Faraday element, a magnet generator for applying a magnetic field in a direction of an optical axis of the Faraday element to the Faraday element according to respective driving currents from the first and second controllers, and a magnet for applying a magnetic field, which is in a direction orthogonal to the optical axis of the Faraday element and which magnetically saturates the Faraday element, to the Faraday element.

* * * * *